HARRISON & REYNOLDS.
Coffee Cooler.
No. 39,098. Patented June 30, 1863.
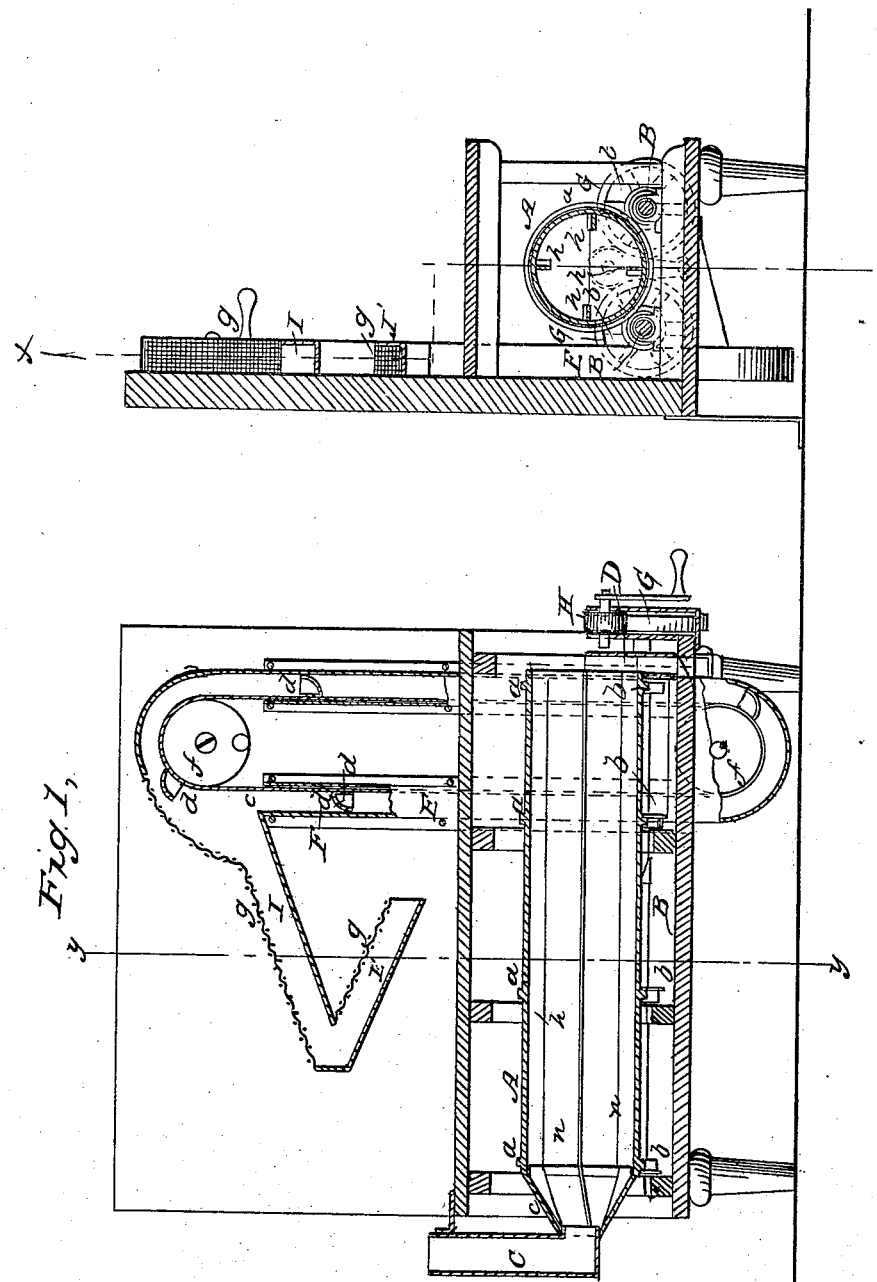

UNITED STATES PATENT OFFICE.

DANIEL G. HARRISON AND JABEZ REYNOLDS, OF CINCINNATI, OHIO, ASSIGNORS TO HARRISON & WILSON, OF SAME PLACE.

IMPROVEMENT IN APPARATUS FOR COOLING COFFEE.

Specification forming part of Letters Patent No. 39,098, dated June 30, 1863.

*To all whom it may concern:*

Be it known that we DANIEL G. HARRISON and JABEZ REYNOLDS, both of Cincinnati, in the county of Hamilton and State of Ohio, have invented a new and useful Apparatus or Device for Cooling Coffee; and we do hereby declare that the following is a full, clear, and exact description of the same, reference being had to the accompanying drawings, making a part of this specification, in which—

Figure 1 is a longitudinal vertical section of my invention, taken in the line $x\ x$, Fig. 2; Fig. 2, a transverse vertical section of the same, taken in the line $y\ y$, Fig. 1.

Similar letters of reference indicate corresponding parts in the several figures.

This invention relates to an apparatus or device for cooling after the same has been roasted by means of furnaces or the usual coffee-roasting devices.

The invention consists in the employment or use of a horizontal or a slightly-inclined rotating cylinder arranged in connection with an elevator and chutes, as hereinafter fully shown and described, whereby the desired end is attained.

To enable those skilled in the art to fully understand and construct our invention, we will proceed to describe it.

A represents a cylinder, which may be constructed of sheet-metal and of any suitable dimensions and provided with a series of rings, $a$, which are placed upon it at suitable distances apart and rest upon friction-rollers $b$, the latter being on two parallel shafts, B B, at opposite sides of the cylinder and some distances below its center, as shown clearly in Fig. 2. One end of this cylinder terminates in a cone, $c$, into which the feed pipe C is inserted, and the opposite end of the cylinder is open and is over a spout, D, which leads into the lower end of an elevator-box, E. The elevator F is constructed like those usually employed in flouring-mills, a series of buckets, $d$, being attached to an endless belt, $e$, which works over pulleys $f\ f$, the belt and buckets being inclosed by the box E. (See Fig. 1.) The shafts B B, at their ends near the spout D, have each a pulley, G, placed upon them, on which a friction driving-wheel, H, is placed, by which motion is communicated to the cylinder A through the medium of the rollers $b$.

I I' represent two inclined chutes, said chutes being inclined in reverse directions, connected with each other, and the upper one being in communication with the upper and discharge end of the elevator-box E. These chutes may have wire-cloth tops $g$, in order that the air may have free access to them.

Within the cylinder A there are placed longitudinal spiral plates $h$, which extend the whole length of the cylinder. These plates are slightly spiral and have the greatest curve, principally all, at the conical end $c$ of the cylinder.

The operation is as follows: The roasted, warm coffee is discharged into the conical end of the cylinder A through the spout D, and is carried along through the cylinder by the inclination of the same and the spiral plates $h$, or by the pressure of the coffee at the feed end of the cylinder, and discharged into the spout D, which conducts it into the lower end of the elevator-box E, the buckets $d$ carrying up the coffee and discharging it into the chute I, through which it passes into chute I', and is discharged from the lower end of the same into any proper receptacle prepared to receive it. The coffee is cooled in passing through the cylinder and in passing up the elevator-box E, and through the chutes I I', any desired number of the latter being used.

In practice it would probably be desirable to leave the cylinder A slightly inclined, and the spiral plates $h$ will be desirable or preferable, but they may be dispensed with.

This invention is now in operation and works admirably well, saving the labor of several men whom we formerly employed to stir the coffee in order to cool it after being roasted.

We would remark that the elevator may be operated from the cylinder A, or from shafts connected therewith, or it may be operated by a separate application of power.

Having thus described our invention, what we claim as new, and desire to secure by Letters Patent, is—

The rotating cylinder A, with or without the internal spiral plates, $h$, in combination with the elevator F and chutes I, one or more, all arranged for joint operation as and for the purpose herein set forth.

D. G. HARRISON.
JABEZ REYNOLDS.

Witnesses:
W. L. ALDRICH,
OTIS ALDRICH.